Figure 1:
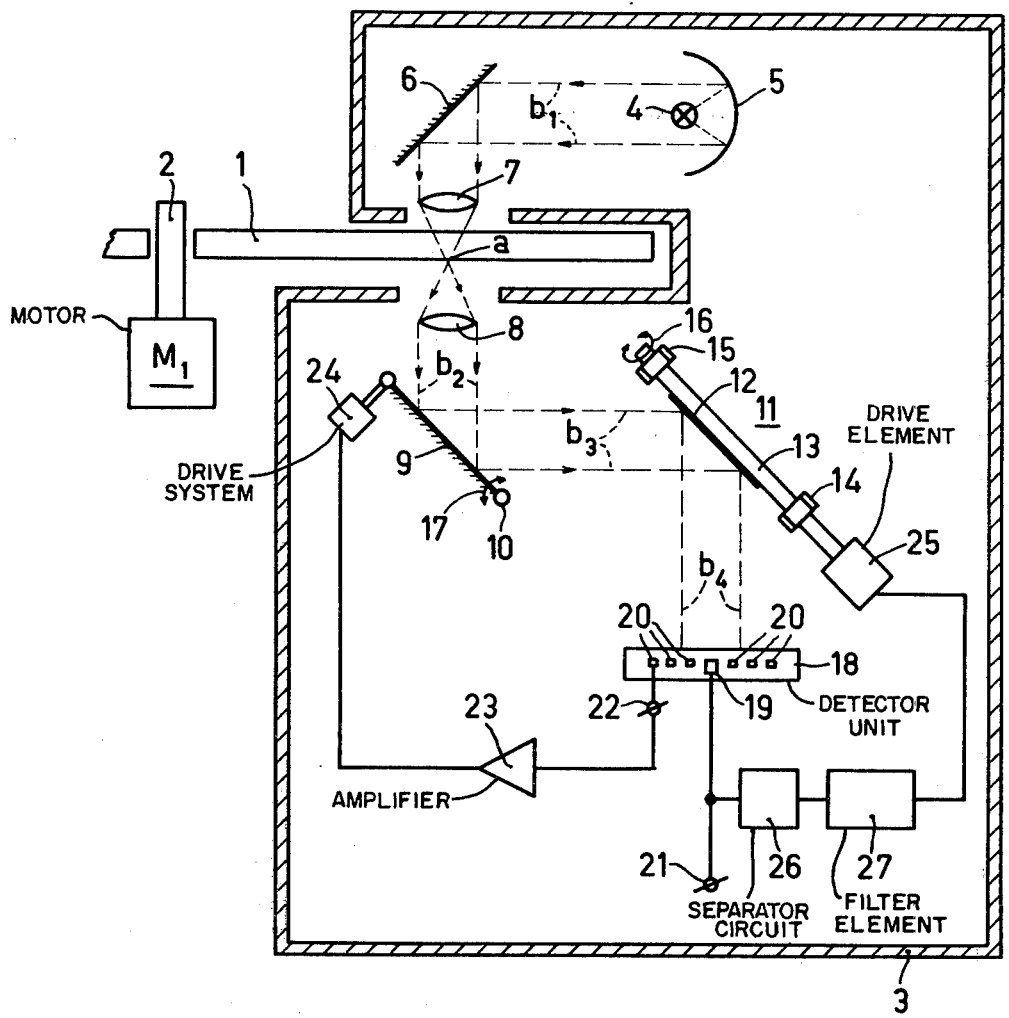

United States Patent [19]

Janssen

[11] 4,005,260
[45] Jan. 25, 1977

[54] DEVICE FOR READING A DISK-SHAPED RECORD CARRIER WITH TIME BASE CORRECTION

[75] Inventor: Peter Johannes Michiel Janssen, Eindhoven, Netherlands

[73] Assignee: U.S. Philips Corporation, New York, N.Y.

[22] Filed: June 17, 1975

[21] Appl. No.: 587,636

Related U.S. Application Data

[63] Continuation of Ser. No. 409,420, Oct. 25, 1973, abandoned.

[30] Foreign Application Priority Data

Nov. 11, 1972 Netherlands .................... 7215306

[52] U.S. Cl. ..................... 358/128; 179/100.3 V; 250/570
[51] Int. Cl.² .................................... H04N 5/76
[58] Field of Search ........... 179/100.3 V; 250/202, 250/570; 178/DIG. 28, 6.7 A, 6.6 R, 6.6 TC, 6.6 DD, 6.6 P; 360/14, 36, 37; 333/79

[56] References Cited

UNITED STATES PATENTS

| | | | |
|---|---|---|---|
| 3,381,086 | 4/1968 | DeMoss | 178/6.7 A |
| 3,463,877 | 8/1969 | Crum | 360/14 |
| 3,530,258 | 9/1970 | Gregg | 178/6.7 A |
| 3,711,641 | 1/1973 | Palmer | 178/6.6 DD |
| 3,873,764 | 3/1975 | Boltz | 178/6.6 R |

Primary Examiner—Bernard Konick
Assistant Examiner—Alan Faber
Attorney, Agent, or Firm—Frank R. Trifari; Simon L. Cohen

[57] ABSTRACT

Device for reading-out a disk-shaped record carrier. To compensate for time-base errors of the detected signal caused by eccentricity or out-of-roundness of the record carrier, a tangential tracking system is provided with which the tangential position of the scanning point on the record carrier can be controlled. A control signal for this tangential tracking system is obtained by extracting the line synchronizing signal from the detected video signal. By ensuring through the use of a filter element that the overall transfer function of the control system exhibits a band-pass characteristic about the frequency which corresponds to the speed of the record carrier, a suitable tangential tracking is ensured.

5 Claims, 4 Drawing Figures

DEVICE FOR READING A DISK-SHAPED RECORD CARRIER WITH TIME BASE CORRECTION

This is a continuation, of application Ser. No. 409,420, filed Oct. 25, 1973, now abandoned.

The invention relates to an apparatus for reading a disk-shaped record carrier, on which in tangentially arranged tracks a signal is stored which includes at least one synchronizing signal, comprising a read unit provided with directing means and a read detector. The information stored in the scanning point of the record carrier is transferred by means of the directing means to the read detector, which supplies the detected signal to an output. The directing means comprises a movable element, which is included in a control system and which in accordance with a control signal which is derived from the synchronizing signal extracted from the detected signal, controls the tangential position of the scanning point.

The invention in particular relates to a device for reading a record carrier on which a video signal is stored in optically coded form, i.e., optically readable, which after processing is suitable to be reproduced via a television receiver. Such a device is known from U.S. Pat. No. 3,381,086. In this known device the directing means consists of a prismatic element having two mirror faces, which are disposed at an acute angle relative to each other and to a beam emerging from the record carrier which is produced by a radiation source and which is modulated by the information on the record carrier. Said prismatic element is rotatable about two different axes, so as to permit both the radial and the tangential position of the scanning point on the record carrier to be controlled. In this respect a scanning point is to be understood to mean that point of the record carrier which is eventually imaged onto the read detector and which is being read.

Said control of the radial and tangential positions of the scanning point is necessary, because for example, owing to out-of-roundnesses of the record carrier or eccentricity of the pivot point the information track is no longer disposed concentrically or spirally about the pivot point. This gives rise both to deviations from the radial position of the scanning point and to timing errors of the detected signal. As the radial positioning of the scanning point and the manner in which said positioning is controlled is of no significance for the invention, only the tangential positioning will be discussed hereinafter. The purpose of this tangential positioning of the scanning point is to compensate for timing errors of the detected signal which are caused by out of roundness and/or excentricities.

In the known device this tangential positioning of the scanning point is achieved by means of a drive system, which under the influence of a control signal is capable of tilting the prismatic element about a certain axis. The control signal for said drive system is obtained by extracting the line synchronizing pulse train from the detected video signal and determining with the aid of a phase detector the difference in phase between said pulse train and a pulse train supplied by a stable oscillator. It is obvious that instead of the line synchronizing pulse train it is also possible to use a separate pilot signal.

Accordingly, both a stable oscillator and a phase detector are required for the tangential control system, which are comparatively expensive elements. Moreover, this control system has the drawback that a possible speed variation of the record carrier results in a less desirable control behaviour. Indeed, such a speed variation results in a frequency difference between the synchronizing pulse train of the detected video signal and the pulse train supplied by the stable oscillator. This means that the difference in phase will continuously increase or decrease. As a result, the mirror deflection will also continually increase or decrease, so that after a certain time the mirror will have attained a maximum possible deflection. Once the mirror has reached this position, further control is impossible, so that the tangential servo-system has become inoperative.

Moreover, such a phase control system has the drawback that controlling is always effected so as to obtain a constant difference in phase between the detected synchronizing pulses and the pulses derived from the stable oscillator. As the disk-shaped record carrier is placed on the playback equipment with an arbitrary annular position, this means that the tangential servo-system should be capable of shifting the scanning point on the record carrier by at least one line spacing in order to obtain the desired phase relationship between the two pulse trains. However, in general this displacement is appreciably greater than the maximum displacement which is required to compensate for the effect of the eccentricity of the record carrier, so that the requirements imposed on the control system are unneccesarily stringent.

It is an object of the invention to provide a tangential control system, which is very simple and inexpensive and which does not exhibit the previously mentioned undesired control behavior. Accordingly, the invention is characterized in that the control system includes a filter element having such a characteristic that the transfer function of the complete control system has a band-pass characteristic, the frequency corresponding to the speed of the record carrier lying within said pass-band.

Preferably, the characteristic of the filter element is such that the slope of the rising and falling edges of the transfer function of the complete control system has an absolute value which at least approximates 6 dB/octave.

The method according to the invention enables in an extremely simple manner to achieve such control of the tangential position of the scanning point that time base errors of the detected signal owing to out-of-roundness or excentricities of the record carrier can be compensated for, while in this control system a possible speed variation of the record carrier speed does not provide a contribution. A speed variation now merely results in the time-base error of the detected signal which is caused by out-of-roundnesses or excentricities, having a slightly deviating frequency. By selecting a sufficiently broad band-pass characteristic for the complete control system, errors of this frequency can still be compensated by the control system. However, as a result of the bandpass characteristic, the component of low frequency caused by the speed variation has no effect, because it lies outside the pass-band of the control system.

It appears that the measure according to the invention can be applied in an extremely simple manner in an optical read device, in which the movable element is constituted by a rotatable mirror system, which may consist of a mirror around which a number of wire windings are arranged, to which a control current can be applied, the assembly being located in a magnetic field. It appears that such a mirror system can be given a frequency characteristic which below a first limit frequency, corresponding to the speed of the record carrier, exhibits a substantially flat response and above said first limit frequency has a slope which at least substantially equals −12 dB/octave. If the mirror system has such a frequency characteristic, the desired band-pass characteristic for the complete control system can simply be obtained by selecting a network having a differentiating character for the filter element.

Although the invention has been described hereinbefore with reference to an optical read device for an optically coded record-carrier, the invention equally applies to differently-coded record carriers. As an example, a disk-shaped record carrier is mentioned having a magnetic layer in which information is stored in a spiral or concentric track. This information can be read by means of a magnetic head which is disposed above the disk. By moving the magnetic head in a tangential direction a time-base error of the detected signal can again be compensated for.

Figure 2:
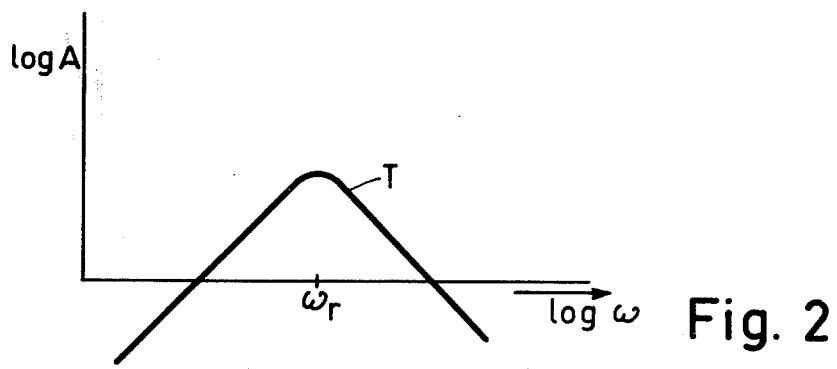
Figure 3:
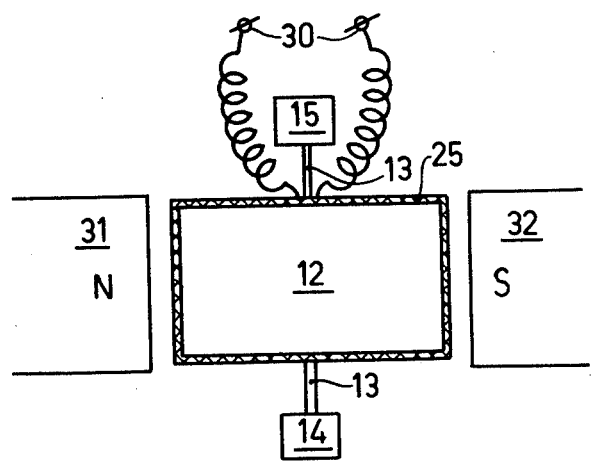
Figure 4:
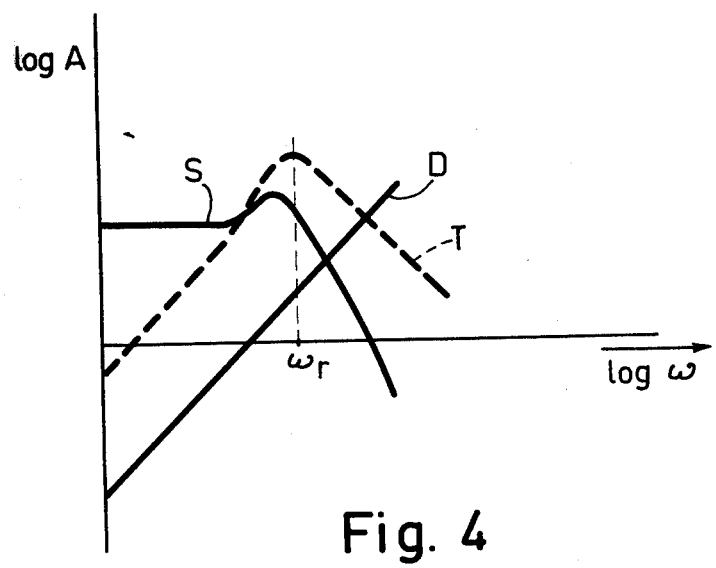

The invention will now be described, by way of example, with reference to the drawing, in which:

FIG. 1 schematically shows an embodiment of the device according to the invention and FIG. 2 shows the desired transfer function, while FIG. 3 shows an embodiment of the mirror system, and FIG. 4 shows the corresponding frequency characteristics The reference numeral 1 in FIG. 1 refers to a disk-shaped record carrier, which is rotated by a motor $M_1$ via a shaft 2 which extends through a central opening of said record carrier. The record carrier 1 contains an information track, which generally has the shape of a spiral and in which, for example, a video signal can be stored in an optical form.

For reading the information contained on the record carrier an optical system is provided, which is accommodated in a housing 3. This housing 3 can be subjected to a continuous radial displacement by means of a drive system, not shown, the speed of the displacement being, for example equal to the pitch of the spiral-shaped information track on the record carrier.

The optical read system comprises a light source 4 and a concave mirror 5, by means of which the light coming from the light source is collimated to a beam $b_1$. This beam $b_1$ is reflected by a mirror 6 in the direction of the record carrier and is focussed on the information track of the record carrier by a lens 7. The emerging ray of light which is modulated by the information, is collimated to a beam $b_2$ by a lens 8. This beam $b_2$ is reflected by a mirror 9 to a beam $b_3$, which in turn is reflected to a beam $b_4$ by a mirror element 11. This last beam $b_4$ eventually impinges on a detector unit 18, which comprises a read detector 19 onto which the scanning point $e$ of the record carrier is imaged. This read detector detects the information contained in the beam, which becomes available at an output terminal 21 and after possible further processing can be applied to the playback equipment.

The detector unit 18 also comprises a measuring detector 20 for determining the radial position of the scanning point $a$ relative to the information track of the record carrier. The measuring detector may take different forms, for example as described in said U.S. patent specification or as described in copending U.S. Pat. application Ser. No. 229,291, filed Feb. 5, 1972, and now U.S. Pat. No. 3,833,769, issued Sept. 3, 1974, and in which the measuring detector consists of a number of light-transmitting and light-absorbing strips onto which the raster formed by the information track is imaged. In FIG. 1 the strip pattern is shown by way of example, and in this respect it is to be noted that in reality the strips 20 should obviously be located within the beam $b_4$. It is also assumed that the area in the scanning point $a$ illuminated by the light beam covers a number of tracks, so that a number of tracks are imaged onto the measuring detector.

A signal, which is a measure of the deviation in the radial direction of the scanning point $a$ relative to the information track is eventually available at an output terminal 22 of the measuring detector 20 and via a control amplifier 23 it is fed to a drive system 24. Under the influence of the control signal, this drive system 24, causes the mirror 9 to rotate about an axis 10 in a direction 17. Due to this angular rotation of the mirror the scanning point $a$, i.e., the point of the record carrier which is eventually imaged onto the read detector 19, is displaced in a radial direction, so that by means of the control system it is possible to ensure that the scanning point $a$ always follows the information track.

Out-of-roundness of the record carrier or eccentricity of the pivot not only results in deviations from the radial position which are compensated for by the radial tracking system, but also in time-base errors of the detected signal. These errors can initially be compensated with the aid of a tangential tracking system which includes the mirror element 11. This mirror element comprises, by way of example, a mirror face 12, which is disposed on a carrier 13. The carrier 13 is rotatable in a direction 16 in two bearings 14 and 15. As a result of a rotation in said direction 16 the scanning point is shifted in a tangential direction, i.e., along the information track. The rotary movement of the carrier 13 with the mirror face 12 is achieved with the aid of a drive element 25, to which a suitable control signal is to be applied.

According to the invention such a control signal is derived from the synchronizing signal which has been extracted from the detected signal using the techniques shown in FIG. 14 of U.S. Pat. No. 2,942,061. If the recorded signal is a video signal, then it is possible to use for example the line synchronizing pulse train for this purpose. This line synchronising pulse train can be extracted in a known manner from the video signal supplied by the read detector 19 with the aid of a separator circuit 26. Said pulse train, is not subjected to a phase comparison with a pulse train supplied by a stable oscillator as in the known device, but is fed to a filter element 27. The signal transferred by said filter element is applied to the drive system 25 for the tangential tracking system.

According to the invention the filter element 27 has such a frequency characteristic that the transfer function T of the complete control system, i.e., of the closed loop of the tangential tracking system, exhibits a band-pass characteristic about the frequency $\omega_r$ which corresponds to the record carrier speed, as is shown in FIG. 2, in which the frequency response of the complete control system is plotted on a logarithmic scale. In view of the stability of the system it is advantageous if the rising and falling edges of this characteristic have a slope whose absolute value is 6 dB/octave.

The advantage of this method of producing a control signal for the tangential tracking system is its simplicity on the one hand and on the other hand the fact that the tangential tracking system does compensate for time-base errors of the detected signal which are caused by out-of-roundness of the record carrier or an eccentricity of the pivot point, but that it does not respond to a possible variation of the record carrier speed. It is true that a deviation in the extracted synchronizing signal at the output of the separator 26 caused by out-of-roundness or eccentricity of the record carrier will be subject to a corresponding frequency shift in the event of a speed variation, but if the bandwidth of the transfer function T about the desired speed is suitably selected it will still be compensated for by the tangential tracking system. The tangential tracking system, however, does not respond to a DC component, caused by said speed variation which would give rise to a monotonous rotation of the mirror element 11, because such a DC component is removed as is apparent from the transfer function T.

The invention can be used with great advantage in an embodiment of the mirror system 11 as is shown in FIG. 3. In said mirror system the drive system 25 is formed by a number of filamentary windings, which are wound around the mirror 12 and to which via two terminals 30 a control current can be applied. The mirror with the windings is located in a magnetic field, which is produced by two opposed magnet poles 31 and 32. A control current applied to the windings will consequently cause a rotation of the mirror about the shaft 13, which is supported in two bearings 14 and 15.

It has been found possible to manufacture such an element with a transfer function as is denoted by the reference letter S in FIG. 4, i.e., a characteristic, which at low frequencies exhibits a substantially flat characteristic, which slightly rises at the resonant frequency of the mirror system which is selected near the speed of the record carrier, and which subsequently falls with a slope of −12 dB/octave. This means that the desired frequency response of the complete control system can be attained in a very simple manner by using a differentiating element for the filter element 27, i.e., an element having a characteristic D. For, if the two characteristics S and D are added to each other, the characteristic T is obtained, which closely approximates the desired characteristic.

When an RC-network is used as a filter element, the cut-off frequency of the network will have to be appreciably higher than the frequency $\omega_r$, to obtain the desired characteristic T by adding the frequency characteristics S and D. When the line synchronization, i.e., a frequency of 15,625 Hz, is used as a synchronizing signal, said cut-off frequency of the differentiating network should moreover have a sufficient spacing relative to the line frequency, because said frequency is to be strongly damped in the control system.

Owing to these requirements the overall gain in the control system may assume a limited value only, thus also imposing a limit on the accuracy of the tangential tracking system. Depending on the desired accuracy a residual time base error in the detected signal can be compensated for with the aid of a variable delay line, for example a bucket brigade. Of course, it is also possible to increase the gain, and thus the accuracy of the control system by recording a separate pilot signal of higher frequency on the record carrier instead of the line synchronizing pulse train, and using this as a synchronizing signal.

The use of an RC-network as a differentiating network has the advantage that the DC component is fully rejected by the capacitance. In this respect is is useful when switching on the system not to connect the mirror element to said RC network until after a certain time, so as to allow the capacitance to store the DC component in the form of a charge. This can be achieved in a simple manner with the aid of a switch which via a delay element is operated when switching on the device.

Accordingly, a very simple control system is thus obtained which, moreover, exhibits an improved control behavior as compared with the known device. To those skilled in the art it will be evident that the invention is not at all limited to the embodiment of the tangential tracking system as shown in FIGS. 1 and 3, in particular the mirror element, and the further optical system. Both mirror elements 9 and 11 may, of course, be combined in a manner as described in U.S. Pat. No. 3,381,086. Alternatively, instead of mirrors, elements may be used which transmit light and which cause a deflection of the light beam upon rotation.

Furthermore, the invention can equally be used in a device in which the disk-shaped record carrier is not scanned with the aid of a transmitted light beam, but in which this light beam is reflected by the disk (see for example, the copending U.S. patent application Ser. No. 335,934, filed Feb. 26. 1973, now U.S. Pat. No. 3,854,015, issued Dec. 10, 1974.

It will be appreciated that the device can be extended so that a suitable control signal for the radial tracking system can be derived from the tangential tracking system. Radial and tangential deviations as a result of out-of-roundness and eccentricity of the record carrier are uniquely correlated, so that a phase shift of the signal for the tangential tracking system by one fourth of a revolution period of the record carrier can yield a suitable signal for the radial tracking system.

What is claimed is:

1. Apparatus for reading a rotating disc-shaped record carrier on which signals including a synchronizing signal are stored in tangentially arranged tracks, comprising read unit means for scanning the tracks of the record carrier, signal controlled means for tangentially moving the scanning of the read unit means with respect to the record carrier, a read detector means for converting the scanned stored signals into an electrical signal, filter element means for deriving the recorded synchronizing signal from the electrical signal, as a control signal, and means connecting said control signal to said signal controlled means, the read unit means, signal controlled means, read detection means, filter means and connecting means comprising a single loop servo control system, said control system having a band-pass characteristic wherein the frequency corresponding to the speed of the record carrier is proximate the peak of said pass-band.

2. A device as claimed in claim 1, wherein the filter means has such a transfer characteristic, that the slope of the rising and falling edges of the transfer function of the complete control system has an absolute value which at least approximates 6 dB/octave.

3. A device as claimed in claim 2, for reading a record carrier on which the signal is stored in optically coded form, further comprising an illumination source, wherein the signal controlled means comprises a rotatable mirror system positioned to reflect a beam which is produced by said radiation source and which is modulated by the signal on the record carrier to the read detector means, the mirror system having a frequency characteristic, which below a first limit frequency, which lies near the speed of the record carrier, has a substantially flat response and above said limit frequency exhibits a slope which at least approximates −12 dB/octave, the filter element means having a differentiating character.

4. A device as claimed in claim 3, wherein the filter element means has a frequency characteristic having a slope of +6 dB/octave up to a second limit frequency, which is higher than the first limit frequency.

5. A device as claimed in claim 1 wherein the control system incorporates a switching unit which does not close the control loop until a certain time after the device has been rendered operative.

* * * * *